United States Patent [19]

Gierer

[11] 4,227,597
[45] Oct. 14, 1980

[54] HYDRAULIC CONTROL SYSTEM FOR A HYDRODYNAMIC/MECHANICAL TRANSMISSION

[75] Inventor: Georg Gierer, Kressbronn, Fed. Rep. of Germany

[73] Assignee: Zahnradfabrik Friedrichshafen Aktiengesellschaft, Friedrichshafen, Fed. Rep. of Germany

[21] Appl. No.: 863,067

[22] Filed: Dec. 21, 1977

[30] Foreign Application Priority Data

Dec. 22, 1976 [DE] Fed. Rep. of Germany ....... 2658195

[51] Int. Cl.² ............................................. F16D 39/00
[52] U.S. Cl. ................................................ 192/3.33
[58] Field of Search ....................... 192/3.33, 3.25, 3.3, 192/2.29, 3.31; 74/733

[56] References Cited

U.S. PATENT DOCUMENTS

| | | | |
|---|---|---|---|
| 2,824,632 | 2/1958 | Lucia et al. | 192/3.31 X |
| 3,001,415 | 9/1961 | Smirl | 192/3.33 X |
| 3,085,449 | 4/1963 | Corte et al. | 74/732 X |
| 4,126,059 | 11/1978 | Smemo | 192/3.33 X |

*Primary Examiner*—George H. Krizmanich

*Attorney, Agent, or Firm*—Karl F. Ross

[57] ABSTRACT

A hydraulic control system for a hydrodynamic/mechanical transmission with hydraulically actuated clutches for selecting the "gears" or "speeds" of the mechanical transmission comprises a hydraulic-pressure source, e.g. a pump connected with the crank shaft of an engine, delivering hydraulic fluid to the clutches via a main pressure line. The pressure in this line is controlled by a main pressure valve such that the excess fluid is supplied to the feed line of the hydrodynamic unit of the hydrodynamic/mechanical transmission, e.g. a torque converter or fluid coupling. At higher fluid excesses in the main pressure line, the hydraulic fluid is bypassed to the intake side of the source between a filter and the pump. The system includes a further pressure valve which constitutes the pressure control valve for the hydrodynamic unit, the latter valve having only two controlled ports and being free from any port connected to the reservoir. The pressure-regulating valve of the hydrodynamic unit acts against a spring and receives the pressure at the intake side of the hydrodynamic unit which is effective against the force of the spring and tends to bias the valve member or spool of this pressure control valve into its closed position.

7 Claims, 1 Drawing Figure

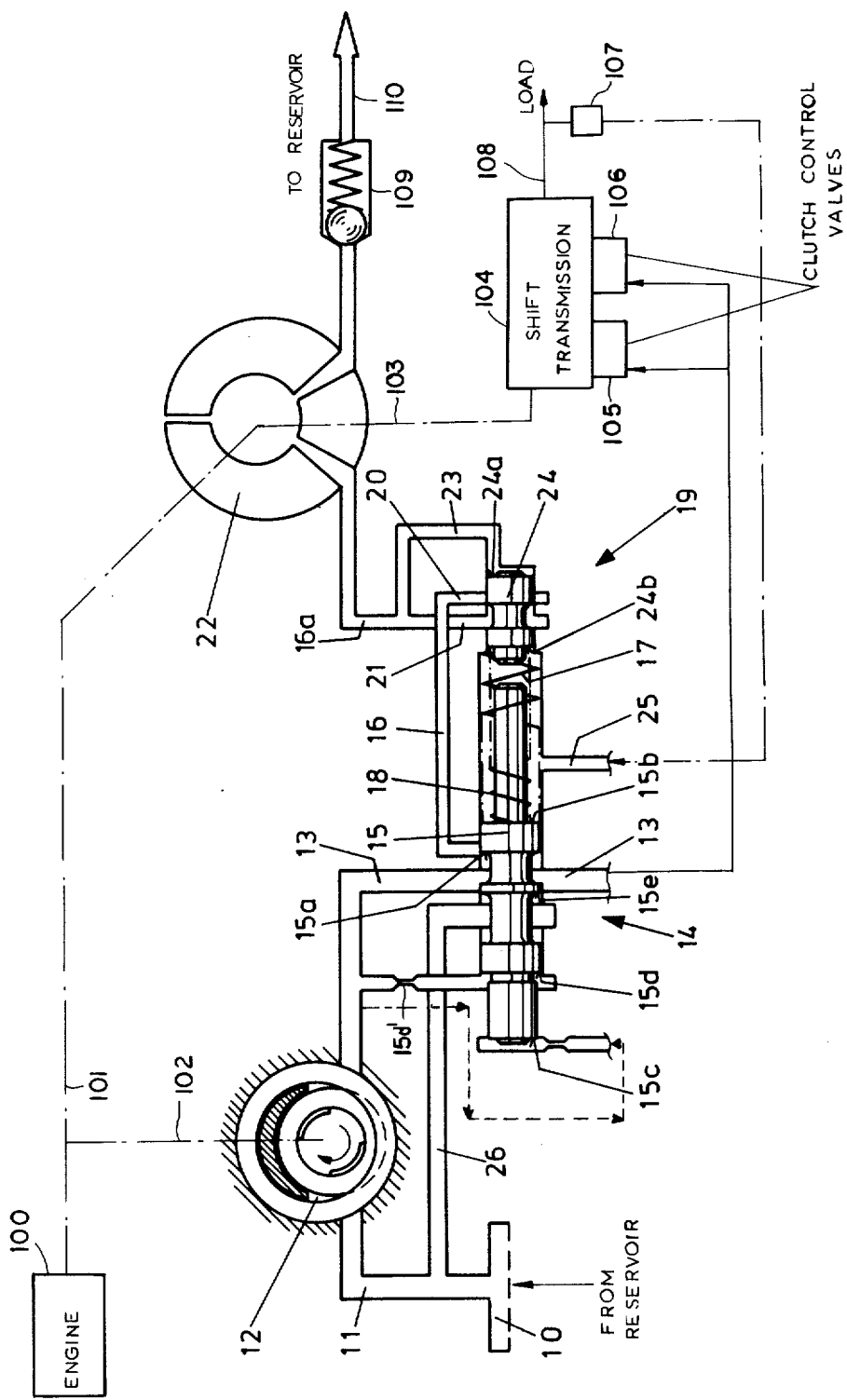

HYDRAULIC CONTROL SYSTEM FOR A HYDRODYNAMIC/MECHANICAL TRANSMISSION

CROSS-REFERENCE TO RELATED APPLICATION

The present application is related to the commonly assigned copending application Ser. No. 860,315, filed Dec. 14, 1977.

FIELD OF THE INVENTION

The present invention relates to a hydraulic control system for a hydrodynamic/mechanical transmission having fluid-operated cluthces for selecting the transmission ratios, "speeds" or "gears" of the mechanical transmission.

BACKGROUND OF THE INVENTION

In many vehicle applications it is common practice to provide between the engine and the load, e.g. the driven wheels of the vehicle, a hydrodynamic/mechanical transmission of which the hydrodynamic unit is constituted by a torque converter or fluid coupling while the mechanical element or unit of the transmission is constituted by a gear transmission shiftable under load and having the various transmission ratios, "gear" or "speeds" selected to appropriate actuation of one or more hydraulically operated clutches.

For the purposes of the present invention and description, such a hydrodynamic/mechanical transmission can be the one described in the aforementioned copending application or in the prior art described below.

In German Pat. DT-PS No. 1 780 067, there is described a hydraulic control system for a hydrodynamic/mechanical transmission of the aforedescribed type in which the pressure in the supply line to the hydrodynamic unit is controlled by a pressure-relief or pressure-limiting valve such that, upon the development of excess pressure in the supply line to the hydrodynamic unit, a port is opened which delivers the surplus fluid to an outlet and thence to the reservoir.

The fluid is usually drawn from the reservoir via a filter by a pump driven by the motive-power source, namely, the engine. It has been found that with such a valve, the inlet pressure is dependent upon the throughflow volume of the valve. In other words, with increasing volume rates of flow of fluid through the valve, the pressure builds up at the inlet side of the hydrodynamic unit in spite of the fact that the valve is intended to limit the pressure at the inlet to the hydrodynamic unit by shunting the excess fluid to the reservoir.

Thus, with relatively large throughflows, the valve spool or member is shifted to its largest opening and thereafter partially blocks the intake so that the pressure in the hydrodynamic unit sharply rises. A greater dimensioning of the flow cross-section of the valve, which might alleviate the problem, is not always possible because of the limited space in which the valve must be located for practical reasons. It has also been found that the use of a pressure-relief valve to shunt the excess fluid to the reservoir has the significant disadvantage that it increases the volume of the hydraulic fluid which must traverse the filter at the intake side of the fluid pressure source, namely, the pump. For a given filter fineness, the requisite of greater volume rates of flow of the fluid, because of these circumstances, means that the filter dimensions must be greatly increased. This has the disadvantage mentioned previously and further increases the cost of the filter.

It is also possible to accommodate the increased throughflows of the fluid by compromising the filter fineness which has the disadvantage that it endangers the functioning of the entire hydraulic network.

OBJECT OF THE INVENTION

It is the principal object of the present invention to provide a hydraulic control system for a hydrodynamic/mechanical transmission of the aforedescribed type wherein the disadvantages set forth above are obivated and improved functioning can be obtained with elements of the circuit of relatively small size.

SUMMARY OF THE INVENTION

This object and others which will become apparent hereinafter are attained, in accordance with the present invention, in a hydraulic control system for a hydrodynamic/mechanical transmission having hydraulically actuated clutches for selecting the transmission ratios of the mechanical component of the transmission, in which a hydraulic pressure source, e.g. a pump, supplies fluid from a filter and a reservoir to a main pressure line which, in turn, delivers the fluid medium to the clutches. The pressure in the main pressure line is controlled by a main pressure valve in such manner that surplus fluid is introduced to the inlet line of the hydrodynamic unit which can be torque converter or fluid coupling and, when the fluid excess increases still further, bypasses the excess fluid to the intake side of the pump between the latter and the filter. To control the inlet pressure of the hydrodynamic unit, the feed line thereof is provided with a further pressure-responsive valve having only two ports and free from a port for discharging fluid from the feed line of the hydrodynamic unit. The pressure-control valve of the hydrodynamic unit has an open neutral position and is disposed within the feed line to the hydrodynamic unit with its valve member or spool biased in one direction by a spring and in the opposite direction by the inlet pressure of the hydrodynamic unit, this pressure serving to displace the spool in the valve-closing sense. In other words, the spring biases the spool toward an open position while the pressure communicated to the opposite side of the spool biases the spool toward its closed position.

According to a feature of the invention, the spring of the control valve for the hydrodynamic unit also serves as the spring against which the main pressure valve spool bears so that a single spring serves as the restoring spring for both valve spools.

According to yet another feature of the invention, the valve spool of the control valve for the pressure of the hydrodynamic unit is biased by a load-dependent modulated control pressure which acts upon its spool in the same direction as the aforementioned spring.

In accordance with the present invention, therefore, the inlet pressure of the hydrodynamic unit operates the pressure-control valve independently of the throughput of the fluid-pressure source. Any excess fluid or fluid pressure is shunted by the main pressure-control valve to the intake side of the pump directly and without traversing the filter.

The pressure-control valve for the hydrodynamic unit has only two controlled ports and an open neutral position in which its spool is held by the spring when the force applied by the inlet pressure to the opposite side of the spool does not displace the latter. In this open neutral position, all of the hydraulic fluid supplied to the hydrodynamic unit tranverses the pressure-control valve and thus passes from one port through the valve to the other port thereof.

For control of the inlet pressure of the hydrodynamic unit, no hydraulic fluid is drained to the outlet or discharge side of the control system.

When very large throughputs are generated by the fluid-pressure source, the flow-cross-section of the pressure-control valve of the hydrodynamic unit is reduced such that the control pressure of the valve (equal to the inlet presssure of the hydrodynamic unit) is independent from the fluid throughput of the main pressure valve and is maintained constant, even during brief complete blockage of the throughflow of the control valve for the hydrodynamic unit.

The resulting increase in pressure at the inlet port to the control valve for the hydrodynamic unit is discharged through the main pressure valve and is hence relieved thereby by a shunting of the surplus fluid into the intake line of the pump behind the filter. This excess fluid does not traverse the filter and for a given filter fineness, the filter dimensions can be reduced or, for filter dimensions, the fineness of the filter passages can be increased to achieve greater functioning reliability.

When a common spring is used as the restoring spring for the two valve spools, and/or a load-modulated pressure is applied in the same direction as the restoring force to the two valve spools, it is possible to control the main pressure and the inlet pressure of the hydrodynamic unit in common and precisely with exact opposing effects and thereby guarantee that the pressure-control valve of the hydrodynamic unit will maintain a completely constant inlet pressure at this unitindependently of any surplus flow of fluid through the main pressure-control valve.

Pressure-control valves without relieving openings are, of course, known, as for example described in "Olhydraulik and Pneumatik", Band 12 Schaltplane der Olhydraulik; H. Zoebl, Mainz (Germany) 1970, pages 22, 40 and 41.

U.S. Pat. No. 3,085,449, FIG. 2, also shows a main pressure valve for the pressure supply of a hydrodynamic/mechanical transmission.

In the latter publication, the pressure limitation in the torque converter requires, in the feed line, a fixed throtte from which surplus fluid is returned to the intake line of the pump, the latter being connected with the oil reservoir or pan. This reference does not deal with the use of a filter.

Furthermore, the fixed throttle in the torque-converter supply line, while serving to reduce the pressure in the torque converter with respect to the remainder of the system, gives rise to an uncontrollable pressure level because of the variation in operating conditions (cold or warm oil).

The system of the present invention thus provides significant advges with respect to control of the pressure at the converter over these prior-art systems. For example, it allows the pressure level at the converter and in the remainder of the system to be modified in accordance with requirements and, because the spring can have any selected spring characteristics, affords a greater degree of adjustability and controllability than the prior-art systems of these later publications.

In addition, during free running of the system, the oil comsumption of the converter can be reduced with the system of the present invention whereas with a fixed throttle, as described in the aforementioned patent, the oil consumption is unavoidably high.

Another advantage of the system of the instant invention is that, during the kickdown operation of the transmission, the hydraulic pressure representing the load is superimposed upon the spring force so that the system and converter pressures can be varied independently of one another and the converter pressure maintained substantially constant over the full range of operating speeds of the pump and other operating conditions of the control system.

BRIEF DESCRIPTION OF THE DRAWING

The above and other objects, features and advantages will become more readily apparent from the following description, reference being made to the accompanying drawing, the sole FIGURE of which is a flow diagram illustrating the control system of the present invention.

SPECIFIC DESCRIPTION

The control system of the present invention can be used to control a hydrostatic/mechanical (shift) transmission of the type described in the aforementioned patents. Basically, such a system can comprise an engine 100 whose crankshaft 101 can be connected as represented by the dot-dash line to a pump 12 serving to supply hydraulic fluid to the control system and particularly to the clutch control valves 105 and 106 which operate the gear-shifting clutches of the mechanical shift transmission 104 which is provided at the output side of a torque converter 22 whose input side is connected to the crankshaft 101. The connection between the torque converter 22 and the shift transmission 104 is represented by the dot-dash line 103. The output shaft 108 of the shift transmission can be connected to the load, e.g. the driven wheels of a vehicle, while a governor 107 or other load-responsive hydraulic transmitter 107 can apply hydraulicfluid pressure representing the load to an inlet 25 as will be described in greater detail hereinafter. From the torque converter, fluid is discharged to the oil pan or tray (reservoir) via line 110 and a check valve 109.

Elements 100-110 are known in the art and were partially described in the publication and patents mentioned previously or in the aforementioned copending application and hence need not be described in greater detail herein. Particularly, the multi-speed gear transmission, shiftable under load, and its connection to the hydrodynamic torque converter, will be apparent from the aforementioned copending application and hence the details thereof need not be discussed here.

The control system of the present invention comprises a filter 10 through which the pump 12 draws fluid from the reservoir via the intake line 11, the discharge side of the pump 12 opening into a main pressure line 13. As shown in the drawing, the main pressure line is connected to the clutch control valves 105 and 106 which can be selectively operated to shift the transmission ratios of the gear transmission. The clutches are thus also hydraulically and selectively actuated.

The pressure in the main pressure line 13 (main pressure) is controlled by a main pressure valve 14 in response to the load. The main pressure valve 14 has a valve member or spool whose control edge 15a cooperates with a port communicating hydraulic fluid from the main pressure line 13 to a passaage 16 hereinafter referred to as the converter-supply line. The spool 15 is acted upon by a pair of compression springs 17 and 18, the compression spring 18 also forming a restoring spring for a spool 24 of the pressure-control valve 19 for the torque converter. The main pressure in line 13 acts against the force of these springs and against a hydraulic force applied to the surface 15b of the spool via line 25. This latter pressure is a load-dependent modulated pressure. The end face 15c and face 15d of the spool are under a supply pressure and a pressure reduced from this supply pressure by a throttle 15d', respectively.

When the throughput of the pump 12 is greater than that necessary to feed the clutches and the torque converter, the control edge 15e of the main pressure valve establishes a connection between the main pressure line 13 and a shunt line 26 delivering the excess fluid to the intake line 11 between the filter 10 and the pump 12. The control edge 15e closes the connection between the main pressure line 13 and the shunt line 26 when the total fluid quantity displaced by the pump 12 is less than that necessary to maintain the torque converter pressure and to supply the clutches.

The torque converter supply line 16, 16a is interrupted by a pressure control valve 19, as previously mentioned, which has only two control ports, namely the inlet port 20 and the outlet port 21. The inlet port 20 communicates with the main pressure valve via line 16 as noted while the outlet port 21 communicates via line 16a at the intake side of the hydrodynamic converter. A control pressure is applied via line 23 from the line 16a to the end face 24a of the spool 24 of valve 19 in a direction opposite the effective direction of the force of spring 18. Naturally the pressure delivered to line 25 is applied to the end face 24b in the same direction as the force of spring 18 and counter to the pressure applied via line 23.

When the pressure applied to surface 24a is insufficient to displace the spool 24 against the force of spring 18, i.e. the inlet pressure of the torque converter 22 is low, the spring 18 holds the spool 24 in the fully opened position. With increasing hydraulic flow, the flow resistance in the torque converter increases so that the pressure at the inlet 16a rises and this increased pressure is transmitted to the surface 24a to progressively close the valve 24 and maintain the pressure in the torque converter substantially constant by balancing the force supplied at surface 24a against the force supplied by spring 18 and that of the hydraulic fluid (load-dependent) delivered at line 25. Should the hydraulic throughput of the pump 12 increase sufficiently, the valve 24 may close completely from time to time to maintain a substantially constant pressure in line 16a.

During these intervals of extreme fluid throughput, the pressure biases the spool 15 to the right to shunt the excess fluid via line 26 to the intake side of the pump.

The combined effect of spring 18 and the hydraulic fluid delivered via line 25 is to increase the torque converter pressure with increasing load.

I claim:

1. A hydraulic control system for a hydrodynamic/mechanical transmission having fluid-operated clutches, comprising:
    a pump having an intake and an outlet;
    a main pressure line connected to said outlet and to said clutches;
    a main pressure valve connected to said main pressure line and having a valve member displaceable with increasing pressure in said main pressure line to bypass hydraulic fluid to said intake;
    a pressure-control valve having only two controlled ports, one of said ports being connected to said main pressure line and the other of said ports being connected to a hydrodynamic unit of said transmission, said hydrodynamic unit having a fluid inlet, said pressure-control valve having a valve member biased by a spring into an open position and means for applying the inlet pressure of said unit to said member of said pressure-control valve in a direction opposite the effective direction of said spring, said pressure-control valve being constructed so that said spring biases said member of said pressure-control valve into an open condition and the inlet pressure applied to the member of said pressure-control valve in the direction opposite the effective direction of said spring urges the latter member toward a closed position; and
    means for applying load-dependent fluid pressure to said member of said pressure-control valve in the direction in which the latter member is biased by said spring.

2. A hydraulic control system for a hydrodynamic/mechanical transmission having fluid-operated clutches, comprising:
    a pump having an intake and an outlet;
    a main pressure line connected to said outlet and to said clutches;
    a main pressure valve connected to said main pressure line and having a valve member displaceable with increasing pressure in said main pressure line to bypass hydraulic fluid to said intake; and
    a pressure-control valve having only two controlled ports, one of said ports being connected to said main pressure line and the other of said ports being connected to a hydrodynamic unit of said transmission, said hydrodynamic unit having a fluid inlet, said pressure-control valve having a valve member biased by a spring into an open position and means for applying inlet pressure of said unit to said member of said pressure-control valve in a direction opposite the effective direction of said spring, said pressure-control valve being constructed so that said spring biases said member of said pressure-control valve into an open condition and the inlet pressure applied to the member of said pressure-control valve in the direction oposite the effective direction of said spring urges the latter member toward a closed position, said spring bearing in opposite directions against both members.

3. A hydraulic control system for a hydrodynamic/mechanical transmission having fluid-operated clutches, comprising:
    a pump having an intake and an outlet;
    a main pressure line connected to said outlet and to said clutches;
    a main pressure valve connected to said main pressure line and having a valve member displaceable with increasing pressure in said main pressure line to bypass hydraulic fluid to said intake; and
    a pressure-control valve having only two controlled ports, one of said ports being connected to said main pressure line and the other of said ports being connected to a hydrodynamic unit of said transmission, said hydrodynamic unit having a fluid inlet, said pressure-control valve having a valve member biased by a spring into an open position and means for applying the inlet pressure of said unit to said member of said pressure-control valve in a direction opposite the effective direction of said spring, said pressure-control valve being constructed so that said spring biases said member of said pressure-control valve into an open condition and the inlet pressure applied to the member of said pressure-control valve in the direction opposite the effective direction of said spring urges the latter member toward a closed position, both said members being axially aligned and said spring bearing in opposite directions against both said members, said members defining between them a chamber receiving said spring and supplied with load-dependent hydraulic-fluid pressure.

4. The control system defined in claim 3, wherein said one of said ports is connected to said main pressure line in said main pressure valve.

5. The control system defined in claim 4 wherein said hydrodynamic unit is a torque converter.

6. The control system defined in claim 5 wherein said inlet communicates with a reservoir through a filter, said system further comprising a shunt line connecting said main pressure valve with said inlet between said pump and said filter.

7. The control system defined in claim 6 wherein said member of said main pressure valve is a spool having a pair of control edges which respectively control fluid flow from said main pressure line to said shunt line and from said main pressure line to said one of said ports of said control valve.

* * * * *